(12) United States Patent
Christopher

(10) Patent No.: US 7,591,478 B2
(45) Date of Patent: Sep. 22, 2009

(54) VEHICLE HITCH ASSEMBLY FOR A VEHICLE AND METHOD OF UTILIZING THE SAME

(75) Inventor: Nicholas G. Christopher, 908 Red Fox La., Oak Brook, IL (US) 60523

(73) Assignee: Nicholas G. Christopher, Oak Brook, IL (US)

( * ) Notice: Subject to any disclaimer, the term of this patent is extended or adjusted under 35 U.S.C. 154(b) by 369 days.

(21) Appl. No.: 11/277,447

(22) Filed: Mar. 24, 2006

(65) Prior Publication Data

US 2007/0222184 A1  Sep. 27, 2007

(51) Int. Cl.
*B60D 1/14* (2006.01)
(52) U.S. Cl. .................................... 280/505; 280/511
(58) Field of Classification Search ............... 280/500, 280/511, 491.2, 491.5, 495
See application file for complete search history.

(56) References Cited

U.S. PATENT DOCUMENTS

| | | | |
|---|---|---|---|
| 2,372,271 A | 3/1945 | Heit | |
| 2,569,086 A | 9/1951 | Zenk | |
| 2,576,461 A | 11/1951 | Kammerer | |
| 3,741,588 A | 6/1973 | Dotterweich | |
| 3,806,161 A | 4/1974 | Pollart et al. | |
| 3,885,817 A | 5/1975 | Christian | |
| 3,993,321 A | 11/1976 | Cote | |
| 4,073,506 A | 2/1978 | Pressley | |
| 4,180,279 A | 12/1979 | Belliveau, Sr. | |
| 4,204,701 A | 5/1980 | Oltrogge | |
| 4,239,253 A | 12/1980 | Golze | |
| 4,266,793 A | 5/1981 | Pryor | |
| 4,274,649 A | 6/1981 | Vanderhorst et al. | |
| 4,275,899 A | 6/1981 | Humphrey | |
| 4,307,893 A | 12/1981 | Ragland | |
| 4,397,475 A | 8/1983 | Dietrich et al. | |
| 4,438,945 A | 3/1984 | Curtis | |
| 4,607,858 A | 8/1986 | Wagner | |
| 4,620,736 A | 11/1986 | Shanks | |
| 4,721,320 A | 1/1988 | Creps et al. | |
| 4,730,841 A | 3/1988 | Ponder | |
| 5,123,668 A | 6/1992 | Ligas | |
| 5,190,195 A | 3/1993 | Fullhart et al. | |
| 5,240,266 A | 8/1993 | Kelley et al. | |
| 5,242,178 A | 9/1993 | Galasso et al. | |
| 5,244,133 A | 9/1993 | Abbott et al. | |
| 5,277,448 A | 1/1994 | Colibert | |
| 5,330,217 A | 7/1994 | McCarthy | |
| 5,421,597 A | 6/1995 | Berner | |
| 5,431,425 A | 7/1995 | Klinkman | |

(Continued)

*Primary Examiner*—Lesley D Morris
*Assistant Examiner*—Jacob Knutson
(74) *Attorney, Agent, or Firm*—K&L Gates LLP

(57) ABSTRACT

The vehicle hitch assembly disclosed herein provides a system and method for modifying a vehicle such as, for example, a performance car, to haul or tow a load. As disclosed herein, the system and method provides an aesthetically pleasing towing assembly that cooperates with the vehicle frame to allow a performance vehicle to tow or haul a load. In one embodiment, a vehicle hitch assembly includes a hitch mounting bracket having a support sleeve, the hitch mounting bracket sized to cooperate with a cavity provided within a vehicle facia. The assembly further includes a hitch adaptor fixedly coupled to the hitch mounting bracket and sized to removably engage a mounting passage provided within the vehicle facia, and a mounting plate configured to removably engage the support sleeve.

22 Claims, 7 Drawing Sheets

U.S. PATENT DOCUMENTS

| | | | |
|---|---|---|---|
| 5,470,088 A | 11/1995 | Adams | |
| 5,501,482 A | 3/1996 | McClive | |
| 5,507,515 A | 4/1996 | Schellenberg et al. | |
| 5,529,231 A | 6/1996 | Burgess | |
| 5,641,108 A | 6/1997 | Ewer | |
| 5,664,717 A * | 9/1997 | Joder | 224/502 |
| 5,671,937 A | 9/1997 | Haberle | |
| 5,678,839 A | 10/1997 | Pobud, Jr. et al. | |
| 5,716,066 A | 2/1998 | Chou et al. | |
| 5,752,639 A | 5/1998 | Rice | |
| 5,772,230 A | 6/1998 | Kemnitz | |
| 5,775,560 A | 7/1998 | Zahn et al. | |
| 5,797,616 A * | 8/1998 | Clement | 280/477 |
| 5,884,930 A | 3/1999 | Cluth | |
| 5,950,891 A | 9/1999 | Brungardt et al. | |
| 6,050,581 A | 4/2000 | Everett | |
| 6,056,306 A | 5/2000 | Rust et al. | |
| 6,068,281 A | 5/2000 | Szczypski | |
| 6,099,008 A | 8/2000 | Caffey | |
| 6,099,011 A | 8/2000 | Beaudoin et al. | |
| 6,131,938 A | 10/2000 | Speer | |
| 6,206,259 B1 | 3/2001 | Brungardt et al. | |
| 6,234,372 B1 | 5/2001 | Rivera | |
| 6,237,824 B1 * | 5/2001 | Bagley | 224/521 |
| 6,290,247 B1 | 9/2001 | Schafer et al. | |
| 6,457,733 B1 | 10/2002 | Hansen | |
| 6,457,734 B1 | 10/2002 | Hansen | |
| 6,460,745 B1 | 10/2002 | Weaver | |
| 6,581,955 B2 | 6/2003 | Aquinto et al. | |
| 6,616,022 B1 | 9/2003 | Naastad | |
| 6,623,025 B2 | 9/2003 | McCoy et al. | |
| 6,644,525 B1 | 11/2003 | Allen et al. | |
| 6,663,126 B2 | 12/2003 | Britton et al. | |
| 6,688,804 B1 | 2/2004 | Parent | |
| 6,695,184 B2 | 2/2004 | Higginbotham, III | |
| 6,709,036 B1 | 3/2004 | Evans | |
| 6,729,638 B2 * | 5/2004 | McCoy et al. | 280/495 |
| 6,742,799 B1 | 6/2004 | Hansen | |
| 6,749,212 B2 | 6/2004 | Mock et al. | |
| 6,796,575 B2 | 9/2004 | Humes | |
| 6,814,366 B2 | 11/2004 | McCoy et al. | |
| 6,846,126 B2 | 1/2005 | Parent | |
| 6,857,545 B2 | 2/2005 | McLemore et al. | |
| 6,971,663 B1 * | 12/2005 | Blake | 280/507 |
| 2004/0219003 A1 * | 11/2004 | Bik et al. | 414/462 |

* cited by examiner

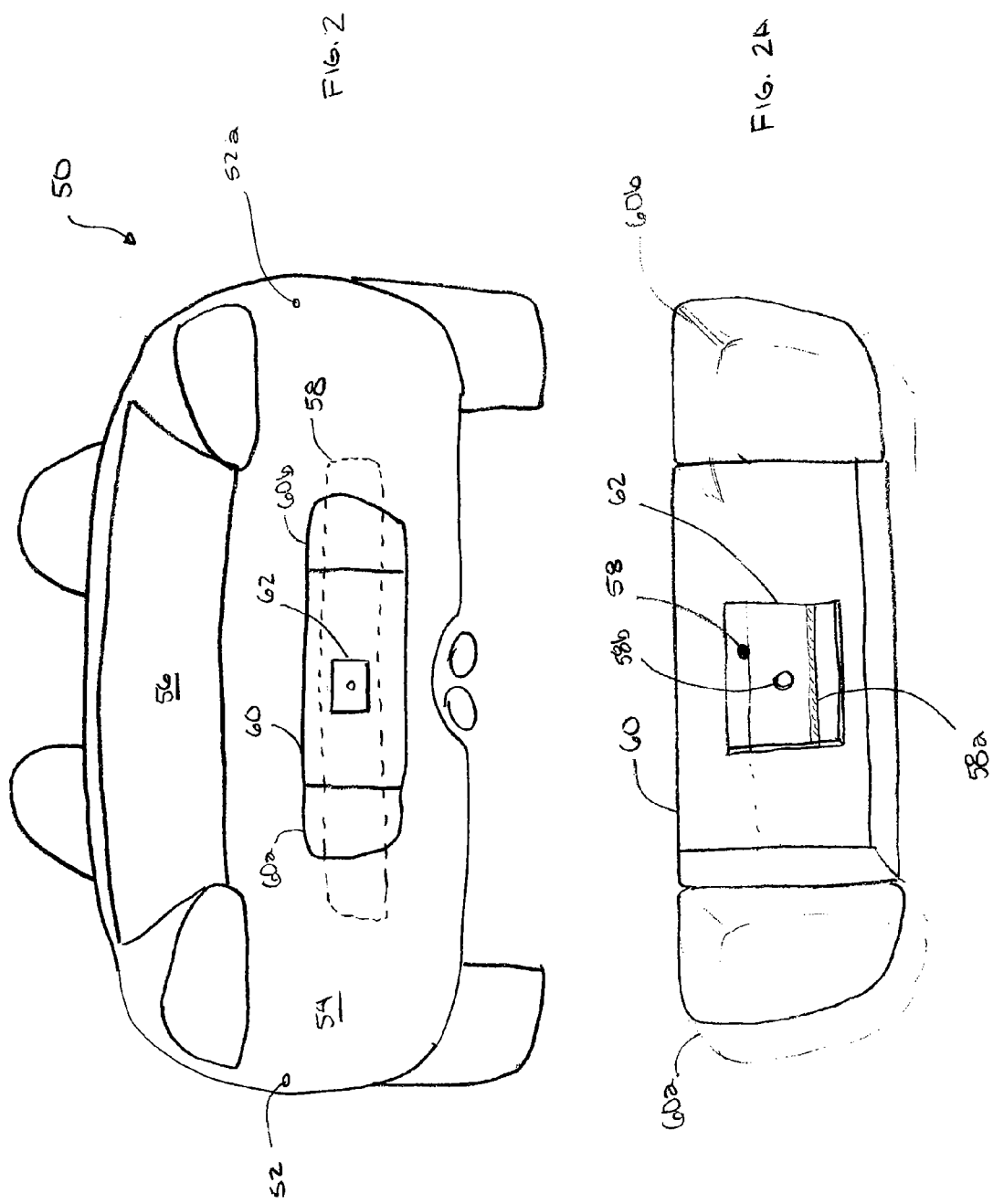

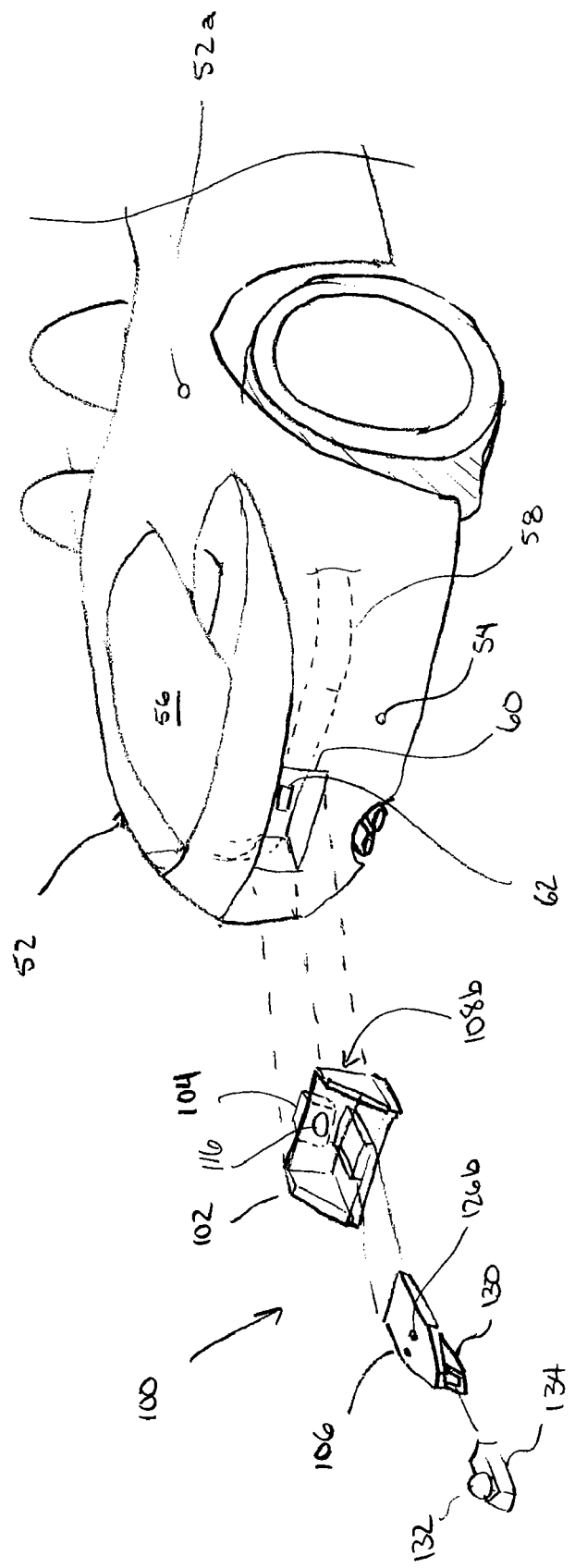

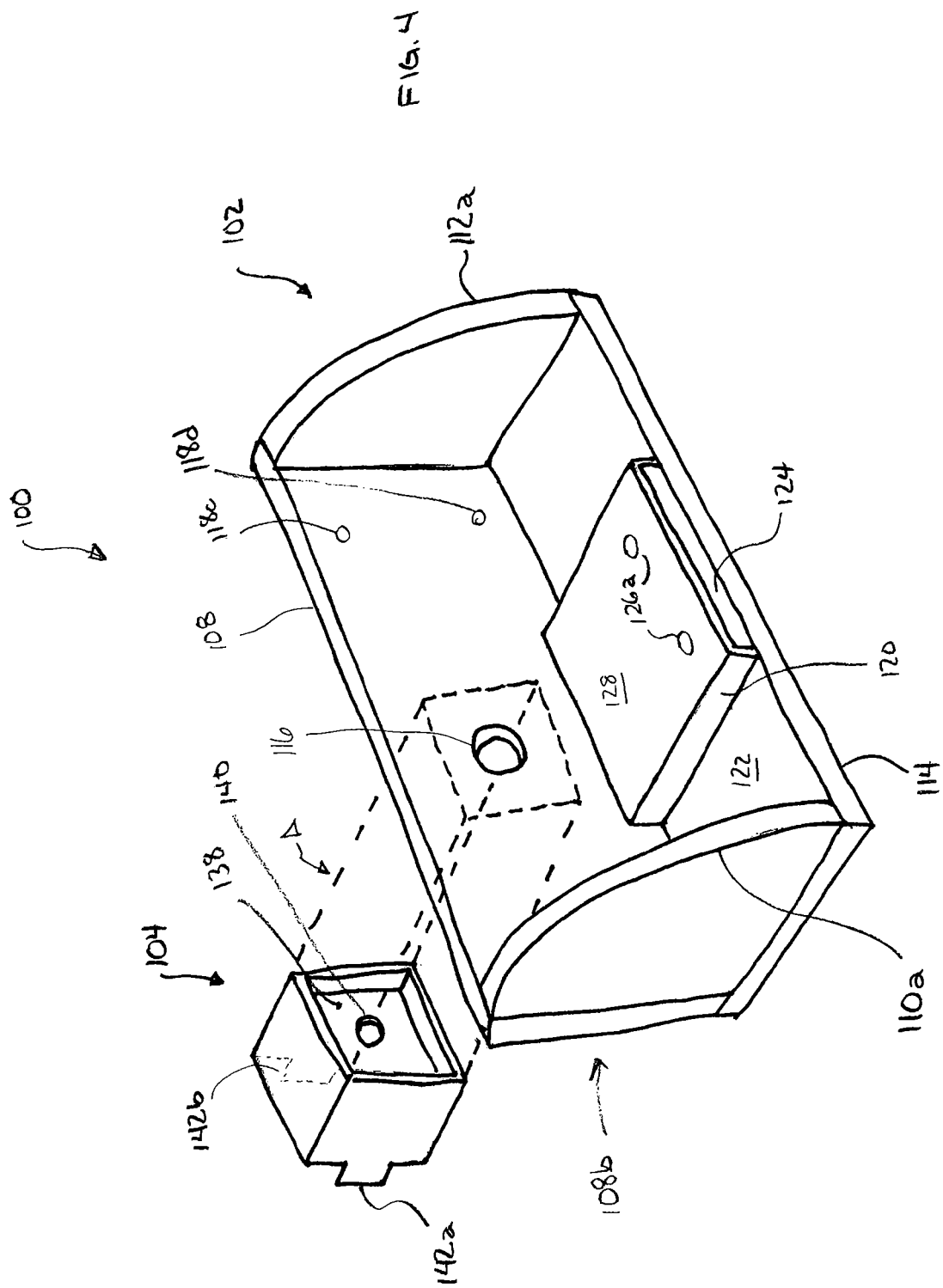

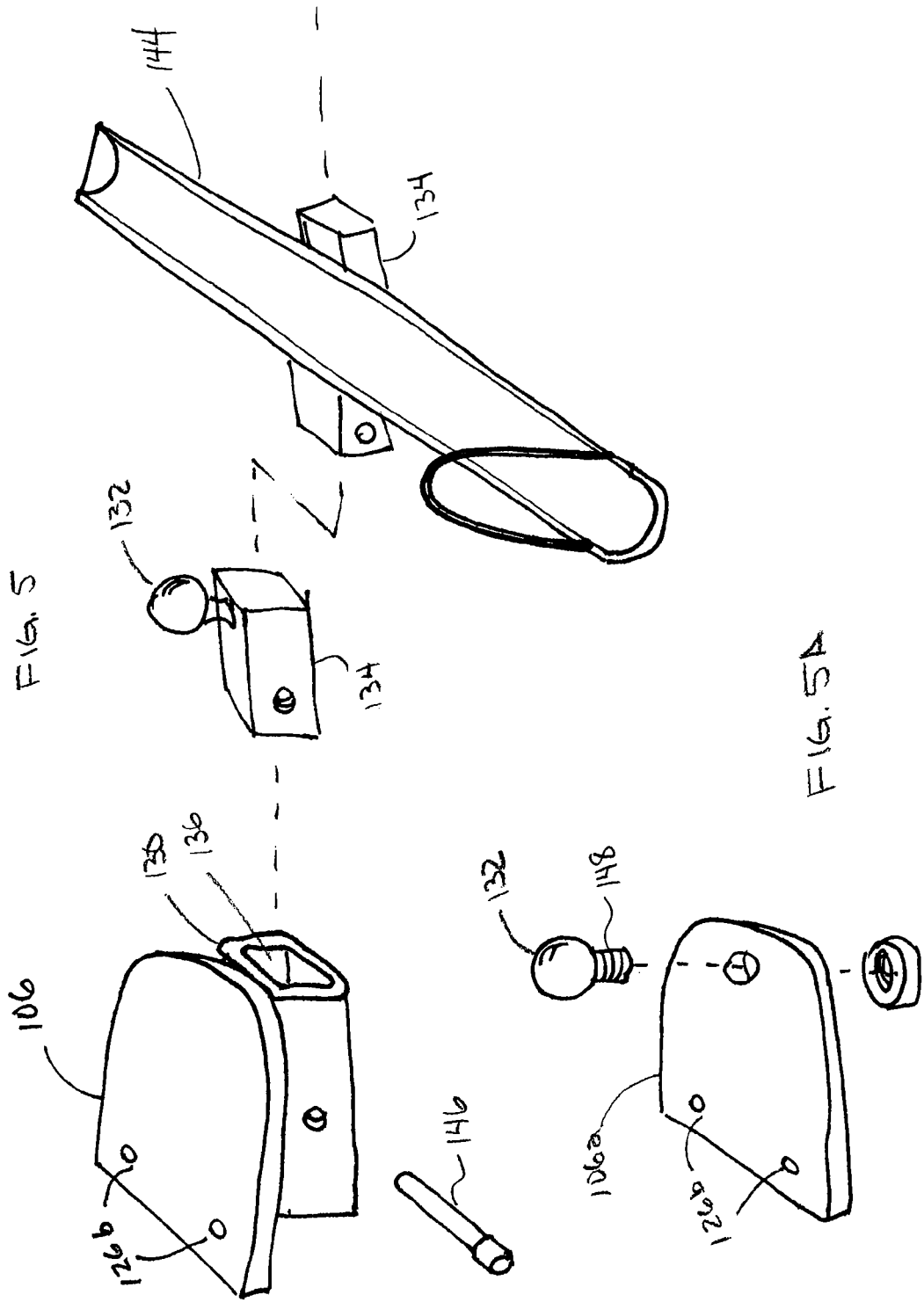

VEHICLE HITCH ASSEMBLY FOR A VEHICLE AND METHOD OF UTILIZING THE SAME

BACKGROUND

Vehicles are commonly utilized to tow or haul loads. For example, vehicles such as trucks and sport utility vehicles are often provided with factory installed hitches or couplers that allow them to tow trailers, boats, or other loads. Other vehicles such as station wagons or sedans are often not provided with factory preinstalled hitches, requiring consumers to retrofit or otherwise installed a hitch apparatus onto the vehicle.

FIGS. 1 and 1A depict two known hitch apparatuses 2, 2a. The hitch apparatus 2 includes a bumper 4 adapted to support a ball hitch 6. The bumper 4 attaches to the vehicle frame (see FIG. 1A) in any known manner that provides a secure connection therebetween. The ball hitch 6, in turn, is supported by the bumper 4 adjacent to a cavity or recess 8 provided for a license plate (not shown) or other accessory. FIG. 1A depicts the hitch assembly 2a having a hitch plate 10 secured under the bumper 4 to a cross brace portion 12 of the vehicle frame 14. The hitch plate 10 supports a hollow receiver 16 adapted to removably secure a hitch adapter 18. The hitch adapter 18 may, in turn, support the ball hitch 6 or any other desired connector.

Vehicles such as sports cars, compacts and subcompacts often have limited storage space and/or are not utilized to haul or tow loads. However, because space is at a premium in these vehicles it may often be desirable to carry or haul loads or personal items in a trailer or other support system. Thus, it may be desirable to provide a tolling or hauling system or assembly that could be utilized with any one of the above identified vehicles.

SUMMARY

The vehicle hitch assembly disclosed herein provides a system and method for modifying a vehicle such as, for example, a performance car or a compact car, to haul or tow a load. As disclosed herein, the system and method provides an aesthetically pleasing towing assembly that cooperates with the vehicle frame to allow the vehicle to tow or haul a load without adversely affecting the vehicle's styling. In one embodiment, a vehicle hitch assembly includes a hitch mounting bracket having a support sleeve, the hitch mounting bracket sized to cooperate with a cavity provided within a vehicle facia. The assembly further includes a hitch adaptor fixedly coupled to the hitch mounting bracket and sized to removably engage a mounting passage provided within the vehicle facia, and a mounting plate configured to removably engage the support sleeve.

In another embodiment, the mounting plate includes a hitch sleeve sized to removably engage a hitch coupler.

In another embodiment, the hitch coupler is attached to an accessory selected from the group consisting of: a ball hitch, a bike rack, a luggage rack and a storage container.

In another embodiment, the mounting bracket includes first and second side panels contoured to conform to the profile of the vehicle facia.

In another embodiment, the mounting bracket include at least one receiving hole positioned to align with at least one aperture formed within a frame member of the vehicle when the mounting bracket is positioned within the cavity.

In another embodiment, the mounting bracket carriers a first bumper and a second bumper.

In another embodiment, the mounting plate includes a pair of spring-loaded detents arranged to removably engage the support sleeve.

In another embodiment, the mounting bracket includes a vehicle license plate mounting frame.

In another embodiment, the hitch adaptor includes at least one tab configured to engage a receiving channel formed in a frame member of the vehicle.

In yet another embodiment, a vehicle hitch assembly includes a mounting bracket sized to cooperate with a cavity provided within a vehicle facia. The mounting bracket includes a back plate, a receiving hole formed through the back plate, the receiving hole aligned with a mounting passage provided in the vehicle facia when the mounting bracket is supported within the cavity, a hitch adaptor fixedly attached to the back plate and sized to slideably engage the mounting passage, and a support sleeve. The assembly further includes a mounting plate configured to removably engage the support sleeve and carrying a hitch sleeve. The assembly further includes a hitch coupler sized to removably engage the hitch sleeve.

In another embodiment, the hitch coupler is attached to an accessory selected from the group consisting of: a ball hitch, a bike rack, a luggage rack and a storage container.

In another embodiment, the mounting bracket carriers first and second side panels contoured to conform to the profile of the vehicle facia.

In another embodiment, the mounting bracket carriers a first bumper and a second bumper.

In another embodiment, the mounting plate includes a pair of spring-loaded detents arranged to removably engage the support sleeve.

In another embodiment, the mounting bracket includes a vehicle license plate mounting frame.

In another embodiment, the hitch adaptor includes at least one tab configured to engage a receiving channel formed in a frame member of the vehicle.

In yet another embodiment, a method of hauling a load with a vehicle is disclosed. The method includes providing a mounting bracket sized to cooperate with a cavity provided within a vehicle facia, the mounting bracket having a back plate, a receiving hole formed through the back plate, the receiving hole aligned with a mounting passage provided in the vehicle facia when the mounting bracket is supported within the cavity, a hitch adaptor fixedly attached to the back plate, the hitch adaptor sized to slideably engage the mounting passage and a support sleeve. The method further includes providing a mounting plate having a hitch sleeve and configured to removably engage the support sleeve. The method further includes providing a hitch coupler sized to removably engage the hitch sleeve.

In another embodiment, providing the hitch coupler includes attaching an accessory to the hitch coupler selected from the group consisting of: a ball hitch, a bike rack, a luggage rack and a storage container.

In another embodiment, providing the mounting bracket includes providing first and second side panels and contouring the first and second side panels to conform to the profile of the vehicle facia.

In another embodiment, providing the mounting bracket includes providing a first bumper and a second bumper fixedly attached to the back plate.

Additional features and advantages of the disclose system and method are described in, and will be apparent from, the following Brief Description of the Figures and the Detailed Description provided below.

BRIEF DESCRIPTION OF THE FIGURES

FIG. 2 depicts a rear view of a vehicle configured to support one embodiment of a hitch assembly constructed in accordance with the present disclosure.

FIG. 2A depicts an enlarged rear view of the vehicle shown in FIG. 2.

FIG. 3 depicts a perspective view of one embodiment of the hitch assembly aligned with the vehicle shown in FIG. 2.

FIG. 4 depicts an exploded perspective view of one embodiment of the hitch assembly.

FIG. 5 depicts an exploded perspective view of a mounting plate and representative accessories.

FIG. 5A depicts an exploded perspective view of another mounting plate.

DETAILED DESCRIPTION

Figure 1:
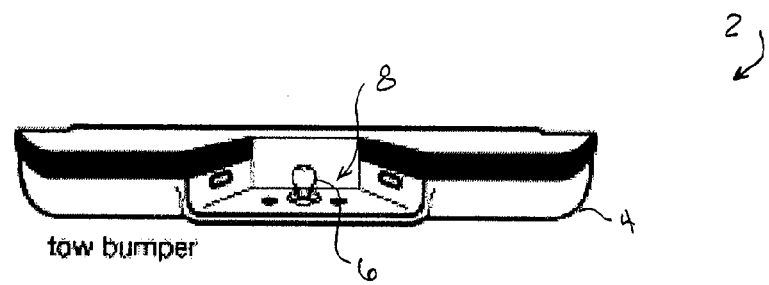
FIGS. 1 and 1A depict known vehicle hitch apparatuses configured to mount on a vehicle bumper.
Figure 1A:
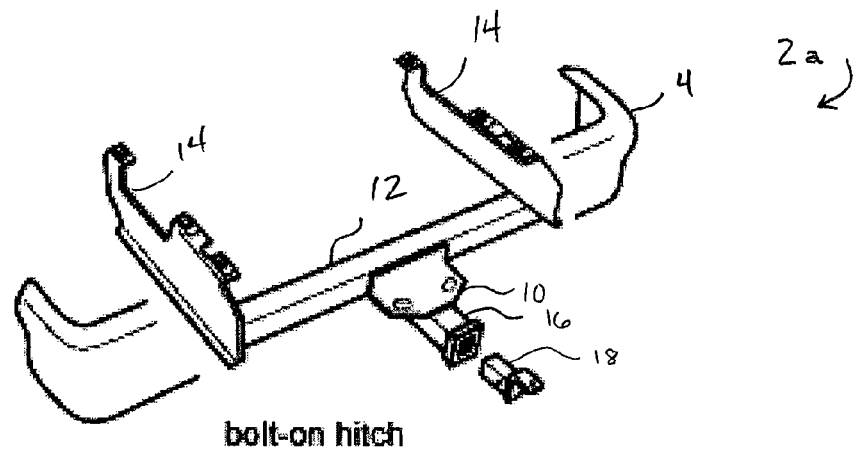

FIG. 2 depicts an exemplary vehicle 50 such as a sports car, a compact car or a subcompact car. The vehicle 50 could be, for example, a PORSCHE® BOXSTER®, a MAZDA RX-5® or any other vehicle for which additional towing or hauling capacity may be desired. The vehicle 50 includes side panels 52, 52a, a rear facia 54 and a boot lid or cover 56 securely mounted to and covering a rear vehicle frame 58 (illustrated as a hidden line to indicate that it is concealed beneath the panels and fascia). The side panels 52, 52a, the rear facia 54 and the boot lid 56, are collectively referred to as the body panels and typically provide the vehicle 50 with aesthetic and styling elements. The rear vehicle frame 58, and the vehicle frame in general, provides the vehicle 50 with structural integrity, stability and a matrix through which power and force can be distributed. Thus, the vehicle frame and the rear vehicle frame 58 play an integral role in distributing and supporting the force generated when the vehicle 50 tows or carries a load. Because the vehicle frame and the rear vehicle frame 58

In one embodiment, a cavity 60 is integrally formed within the rear facia 54. The cavity 60 can be bracketed or flanked by a pair of bumper 60a and 60b. Alternatively, the cavity 60 can simply be a recess or indented portion of the rear facia sized to accept a license plate. The cavity 60 can further include a mounting passage 62 that provides access to the rear vehicle frame 58. FIG. 2A depicts an enlarged view of the cavity 60 provided within the rear facia 54. In the depicted embodiment, the mounting passage 62 is essentially a hole cut or formed within the material of the rear facia 54 that provides access to the rear vehicle frame 58. However, the mounting passage 62 could include a reinforced portion or perimeter to provide additional support and structural integrity. The mounting passage 62 reveals that the rear vehicle frame 58 includes a channel 58a and a threaded aperture 58b. In alternate embodiments, the rear vehicle frame 58 could be a single contiguous member that may be machine or otherwise modified to include apertures, channels, or other useful mounting and attachment features.

FIG. 3 depicts a perspective view of the rear facia 54 of the vehicle 50 positioned such that the cavity 60 aligns with a vehicle hitch assembly 100. In one embodiment, the vehicle hitch assembly 100 is sized to removably cooperate with the cavity 60 such that the vehicle hitch assembly 100 replaces the factory-installed or aftermarket license plate mounting bracket that is normally mounted within the cavity 60. For example, the vehicle hitch assembly 100 can be designed to replace the standard license plate mounting hardware that supports, for example, a standard sized American license plate or a European-style license plate. In another embodiment, the vehicle hitch assembly 100 can further support removable or replaceable bumpers, e.g., the bumpers 60a, 60b, or other damage prevention devices such as, for example, light, reflectors or a rearward facing charged coupled device (CCD) camera.

In one embodiment, the vehicle hitch assembly includes a hitch mounting bracket 102, a hitch mounting adaptor 104 (see FIG. 4) and a hitch mounting plate 106. The hitch mounting bracket 102 in this exemplary embodiment is a substantially rectangular structure that includes a flat back plate 108 having a back surface 108b, and a front surface 108a sized to support a license plate. The back surface 108b of the plate 108 carries the hitch mounting adaptor 104. The hitch mounting bracket 102 further includes a pair of side panels 110 and 112 and a bottom panel 114. The side panels 110, 112 and the bottom panel 114 partially enclose the perimeter of the back plate 108 to protect the license plate and provide additional structural integrity to the bracket 102. The license plate can be secured within the partially enclosed perimeter using mounting holes 118a, 118b, 118b and 118d, collectively identified as mounting holes 118. Alternatively, magnets or adhesive could be utilized to secure the license plate in a desired position.

Figure 3A:
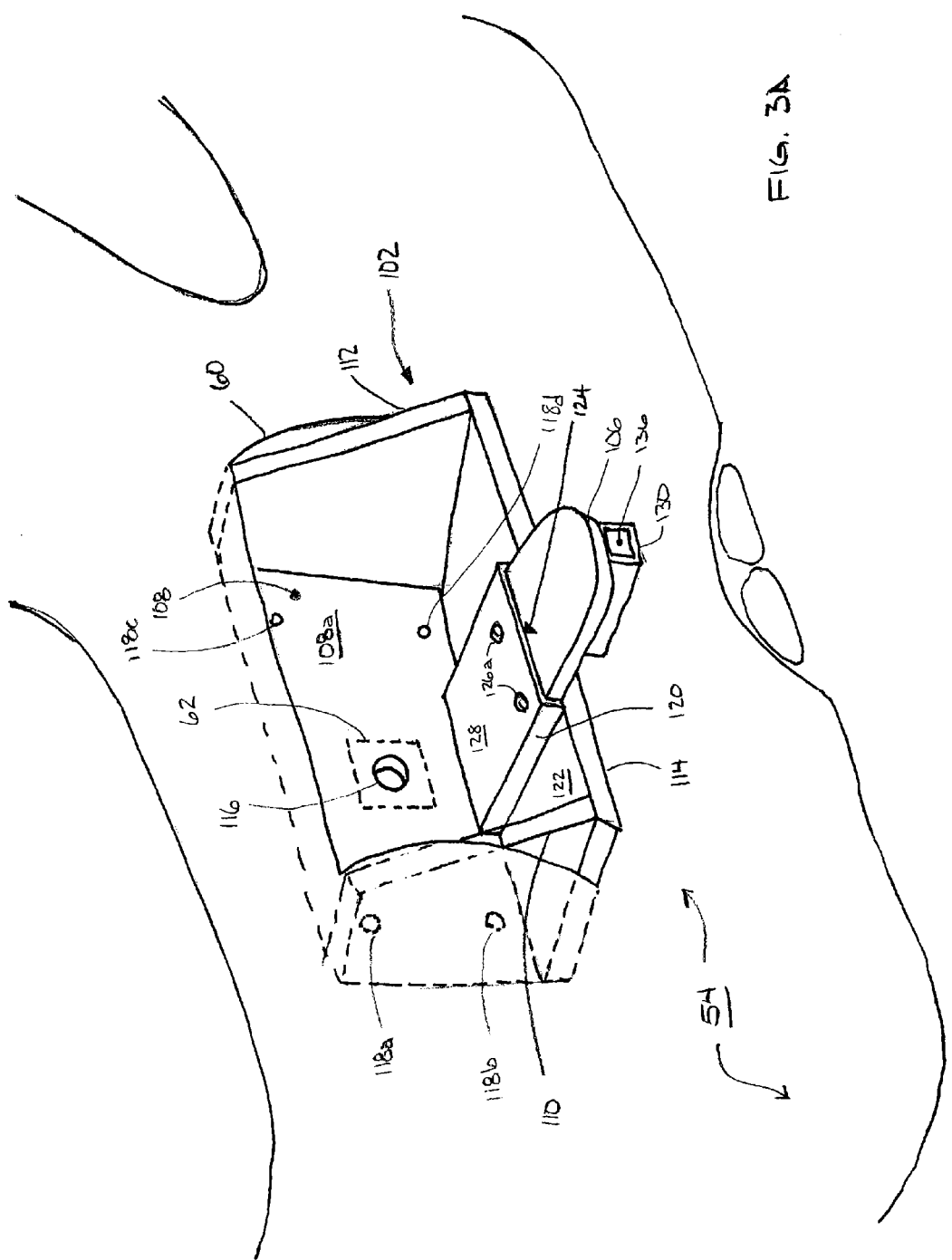
FIG. 3A depicts a perspective view of the hitch assembly generally shown in FIG. 3.

FIG. 3A depicts the generally open rectangular structure of the hitch mounting bracket 102 aligned within the cavity 60. The hitch mounting adaptor 104, when the hitch mounting bracket 102 is positioned with the cavity 60, extends through the mounting passage 62 to the rear vehicle frame 58 (see FIGS. 2 and 3). The hitch mounting bracket 102 and the hitch mounting adaptor 104 can be secured to the rear vehicle frame 58, and within the cavity 60, by removably positioning a threaded fastener or bolt within a receiving hole 116 formed within the back plate 108. The threaded fastener, in turn, passes through the hitch mounting adaptor 104 to engage the threaded aperture 58b provided within the vehicle frame 58. In this manner a structurally secure connection between the hitch mounting bracket 102 and the rear vehicle frame 58 can be established through the rear facia 54.

While the hitch mounting bracket 102 and the cavity 60 are illustrated as having substantially rectangular configurations, it will be understood that many other configurations of the hitch mounting bracket 102 could be utilized in conjunction with the cavity 60. For example, if the cavity 60 defines a substantially ellipsoidal shape, the hitch mounting bracket 102 could manufactured to provide a substantially complementary shape to thereby cooperate with a similarly shaped cavity 60. Thus, it is clear that the general shape of the hitch mounting bracket 102 is less critical than the complementary nature between the hitch mounting bracket 102 and the cavity 60 formed within the rear facia 54 of the vehicle 50.

FIG. 3A further depicts that the bottom panel 114 extends beyond the rear facia 54 and carries a support sleeve 120 along a top or inner surface 122. The support sleeve 120 is sized to slideably support and engage the mounting plate 106. In particular, the support sleeve 120 defines a hollow channel 124 into which the mounting plate 106 can be positioned. Once positioned within the hollow channel 124, the support sleeve 120 can be secured via complementary apertures 126 formed through a top surface 128 of the support sleeve 120. It will be understood that the complementary apertures 126 include the apertures 126a aligned with complimentary apertures 126b and 126c formed within the mounting plate 106 (see FIG. 3) and the bottom panel 114, respectively. These components can be removably secured together using fasteners such as, for example, removable posts and cotter pins, or spring-loaded detent pins secured within the mounting plate 106. For example, the spring-loaded detent pins can be screwed or otherwise fastened within apertures 126b of the mounting plate 106 such that upon insertion into the hollow channel 124 of the support sleeve 120, the detent pins are forced to retract by the narrow confines of the channel until extending into the complementary apertures 126a and 126c. By depressing and extending the detent pins, the mounting panel 106 can be removably secured within the support sleeve 120 without the need for extra tools or hardware.

The mounting plate 106, when secured within the support sleeve 120, extends substantially perpendicular to the rear facia 54 and the mounting bracket 102. The extended mounting plate 106 includes a hitch sleeve 130 sized to slideably accept a ball hitch 132 fixedly or removably attached to a hitch coupler 134 (see FIGS. 3A and 5). In this exemplary embodiment, the hitch sleeve 130 is manufactured from square tubing having a hollow interior 136 sized to accept and support the hitch coupler 134 (see FIG. 3). In other embodiments, the hitch sleeve 130 and the hitch coupler 134 may be produced with other complementary cross-sections such as, for example, round or rectangular.

The materials used in the production of the vehicle hitch assembly 100 could include, but are not limited to, steel, plastics and other polymers, Kevlar®, graphite and graphite mesh, and any combination of these materials. Furthermore, these materials may be treated using known heat treatment, plating and/or painting techniques to, among other things, match or compliment the finish of the vehicle 50 and improve the strength and performance of the assembly 100. Moreover, the vehicle hitch assembly 100 can be treated and painted to blend into the design of a new vehicle while simultaneously providing additional towing or hauling capability, or can be retro-fitted as into the design of an existing vehicle to provide the same capabilities. For example, the vehicle hitch assembly 100 can be designed and shaped to match the curves and contours of the rear facia 54 and painted to match the vehicle color or detailing. Because the mounting passage 62 is concealed or located behind the hitch mounting bracket 102, the modification does not alter the aesthetics of the vehicle 50. In another embodiment, the hitch mounting bracket 102 could be replaced with a standard license plate holder or bracket when towing capabilities are not required or desired.

FIG. 4 depicts an exploded perspective view of the hitch mounting bracket 102 aligned relative to the hitch mounting adaptor 104. In this embodiment, the hitch mounting bracket 102 includes side panels 110a, 112a profiled to complement the contours of the rear facia 54. It will be understood that other modifications may be made to the side panels 110a, 112a, the back plate 108 and bottom panel 114 in order to provide seamless interface between the vehicle hitch assembly 100 and the cavity 60 provided within the rear facia 54.

The hitch mounting adaptor 104, as illustrated in this embodiment, is a substantially rectangular adaptor sized to slideably engage the mounting passage 62. The hitch mounting adaptor 104 may include an alignment plate 138 that provides additional structural integrity to the adaptor and includes an aperture 140. When the hitch mounting adaptor 104 is secured to the back surface 108b of the back plate 108, the aperture 140 and the receiving hole 116 will typically be co-linearly aligned to guide and support a threaded fastener (not shown) into rotational engagement with the threaded aperture 58b provided in the rear vehicle frame 58. Alternatively, the hitch mounting adaptor 104 may be integrally formed or cast as a portion of the back plate 108 to eliminate the need to weld or otherwise couple the two components.

The hitch mounting adaptor 104 further includes a pair of tabs 142a, 142b arranged distal to the back surface 108b when the adaptor 104 is securely mounted to the back plate 108. The tabs 142a, 142b are, in this embodiment, arranged to extend into and cooperate with the channel 58a when the hitch mounting bracket 102 and the hitch mounting adaptor 104 are positioned within the cavity 60 and the mounting passage 62, respectively. The cooperation of the channel 58a and the tabs 142a, 142b prevent the vehicle hitch assembly 100 from rotating or rocking when a torsional force is applied through the support sleeve 120. Specifically, the tabs 142a, 142b are trapped within the channel 58a such that the torsional force acts against the rear vehicle frame 54 and not the vehicle hitch assembly 100 positioned within the cavity 60.

FIGS. 5 and 5A depict various embodiments of the hitch mounting plate 106 and 106a. As previously discussed, the mounting plate 106 carries the hitch sleeve 130. The hitch sleeve 130 is sized to slideably accept various accessories or optional attachments such as, but not limited to, the ball hitch 132, a bike rack 144, a luggage rack (not shown) or a storage container (not shown). The accessories are secured within the hitch sleeve 130 by sliding or otherwise aligning the hitch coupler 134 to the hollow interior 136 and securing the two compartments via a locking pin 146. FIG. 5A depicts another embodiment of the hitch mounting plate 106a in which the ball hitch 132 is removably attached using a threaded stud 148 and a locking nut 150. In other alternate embodiments, the accessories such as the bike rack 144 could be secured to the mounting plate 106' and coupled directly to the support sleeve 120, thereby eliminating the need for the hitch sleeve 130 and the hitch coupler 134.

Figure 6:
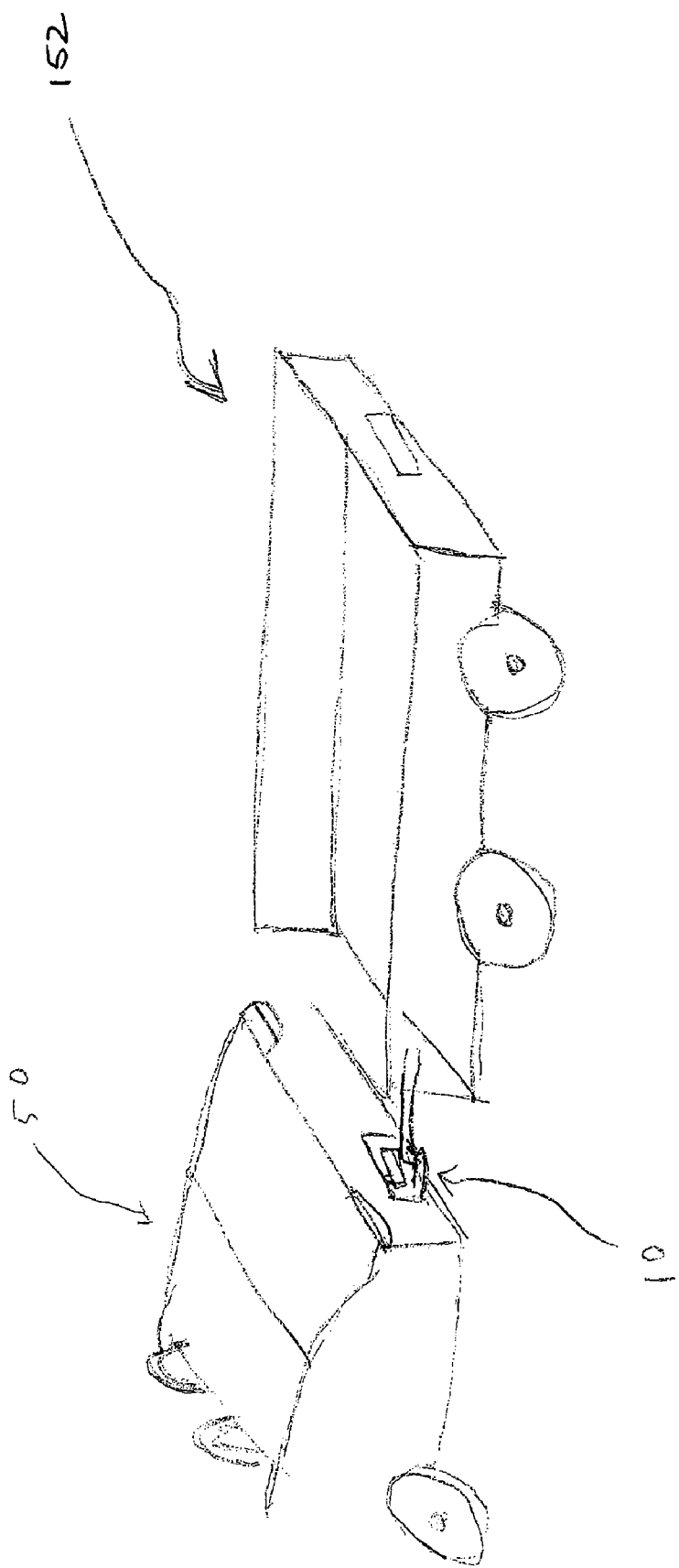
FIG. 6 depicts a perspective views of the vehicle hitch assembly cooperating with the vehicle and a trailer.

FIG. 6 depicts one embodiment of the vehicle hitch assembly 100 mounted on the vehicle 50 and configured to haul a trailer 152.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A vehicle hitch assembly comprising:
a hitch mounting bracket having a support sleeve mounted within the hitch mounting bracket, the hitch mounting bracket sized to cooperate with a cavity provided within a vehicle facia;
a hitch adaptor fixedly coupled to the hitch mounting bracket, the hitch adaptor sized to removably engage a mounting passage provided within the vehicle facia; and
a mounting plate configured to removably engage the support sleeve.

2. The assembly of claim 1, wherein the mounting plate includes a hitch sleeve sized to removably engage a hitch coupler.

3. The assembly of claim 2, wherein the hitch coupler is attached to an accessory selected from the group consisting of: a ball hitch, a bike rack, a luggage rack and a storage container.

4. The assembly of claim 1, wherein the mounting bracket includes first and second side panels contoured to conform to the profile of the vehicle facia.

5. The assembly of claim 1, wherein the mounting bracket includes at least one receiving hole aligned with at least one aperture formed within a frame member of the vehicle when the mounting bracket is positioned within the cavity provided within the vehicle facia.

6. The assembly of claim 1, wherein the mounting bracket includes a first bumper and a second bumper.

7. The assembly of claim 1, wherein the hitch adaptor further comprises an alignment plate for helping to align apertures in a vehicle frame and the mounting bracket.

8. The assembly of claim 1, wherein the mounting bracket includes a vehicle license plate mounting frame.

9. The assembly of claim 1, wherein the hitch adaptor includes at least one tab configured to engage a receiving channel formed in a frame member of the vehicle.

10. A vehicle hitch assembly comprising:
   a mounting bracket sized to cooperate with a cavity provided within a vehicle facia, the mounting bracket includes:
      a back plate;
      a receiving hole formed through the back plate, the receiving hole aligned with a mounting passage provided in the vehicle facia when the mounting bracket is supported within the cavity;
      a hitch adaptor with the back plate mounted within the hitch adaptor, the hitch adaptor sized to slideably engage the mounting passage; and
      a support sleeve;
   a mounting plate configured to removably engage the support sleeve, the mounting plate including a hitch sleeve; and
   a hitch coupler sized to removably engage the hitch sleeve.

11. The assembly of claim 10, wherein the hitch coupler is attached to an accessory selected from the group consisting of: a ball hitch, a bike rack, a luggage rack and a storage container.

12. The assembly of claim 10, wherein the mounting bracket includes first and second side panels contoured to conform to the profile of the vehicle facia.

13. The assembly of claim 10, wherein the mounting bracket includes a first bumper and a second bumper.

14. The assembly of claim 10, wherein the hitch adaptor further comprises an alignment plate for helping to align apertures in a vehicle frame and the mounting bracket.

15. The assembly of claim 10, wherein the mounting bracket includes a vehicle license plate mounting frame.

16. The assembly of claim 10, wherein the hitch adaptor includes at least one tab configured to engage a receiving channel formed in a frame member of the vehicle.

17. A method of hauling a load with a vehicle comprising:
   providing a mounting bracket sized to cooperate with a cavity provided within a vehicle facia, the mounting bracket including:
      a back plate;
      a receiving hole formed through the back plate, the receiving hole aligned with a mounting passage provided in the vehicle facia when the mounting bracket is supported within the cavity;
      a hitch adaptor fixedly attached to the back plate, the hitch adaptor sized to slideably engage the mounting passage; and
      a support sleeve mounted within the mounting bracket;
   providing a mounting plate configured to removably engage the support sleeve, the mounting plate including a hitch sleeve; and
   providing a hitch coupler sized to removably engage the hitch sleeve.

18. The method of claim 17, wherein providing the hitch coupler includes attaching an accessory to the hitch coupler selected from the group consisting of: a ball hitch, a bike rack, a luggage rack and a storage container.

19. The method of claim 17, wherein providing the mounting bracket includes: providing first and second side panels; and contouring the first and second side panels to conform to the profile of the vehicle facia.

20. The method of claim 17, wherein providing the mounting bracket includes providing a first bumper and a second bumper fixedly attached to the back plate.

21. The assembly of claim 1, wherein the mounting plate is configured to fit within the support sleeve.

22. The assembly of claim 1, wherein the hitch adaptor further comprises a vertical alignment plate for helping to align apertures in a vehicle frame and the mounting bracket.

* * * * *